Sept. 25, 1934. E. G. SLATEN 1,974,757
POTATO PLANTER
Filed Oct. 19, 1931 3 Sheets-Sheet 2

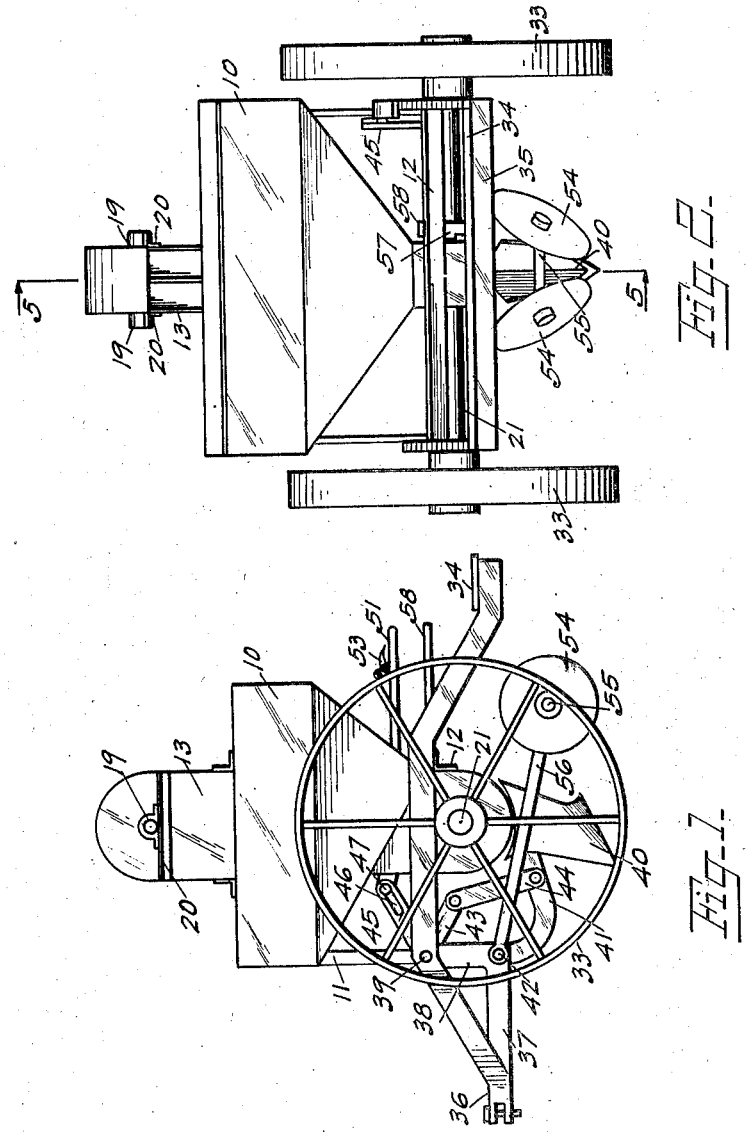

Sept. 25, 1934.  E. G. SLATEN  1,974,757
POTATO PLANTER
Filed Oct. 19, 1931   3 Sheets-Sheet 3

INVENTOR.
Ernest G. Slaten
BY Harry C. Schroeder
ATTORNEYS.

Patented Sept. 25, 1934

1,974,757

UNITED STATES PATENT OFFICE 1,974,757

POTATO PLANTER

Ernest G. Slaten, Stockton, Calif.

Application October 19, 1931, Serial No. 569,652

5 Claims. (Cl. 221—128)

This invention is a potato planter which can be adapted for operation by any tractive means, tractor, horse or hand.

The main object of the invention is to provide a potato planter which will plow the furrow, feed potato eyes uniformly in the furrow and cover the eyes.

Another object of the invention is to provide a device as outlined with means for loosening the potato eyes in the feeding means.

Other objects and advantages of the invention will become apparent as the following description is read on the drawings forming a part of this specification and in which similar reference characters are used to designate similar parts throughout the several views and in which:

Fig. 1 is a side elevation of the invention.

Fig. 2 is a rear elevation of the invention.

The invention consists of a hopper suitably supported on a frame and provided with feeding means for potato eyes, a plow for forming a furrow, and covering means for the eyes, the device being suitably mounted on wheels, the wheels driving the feeding means.

The hopper 10 may be of any suitable form with sloping bottom and suitably supported as at 11 and 12.

The feeding means consists of a bucket elevator centrally disposed in the hopper and provided with a housing 13 which is closed to the hopper except at the opening 14 on the up-travel side of the elevator, the bottom of the hopper sloping from all sides to this point and the elevator housing extending below the bottom of the hopper. The housing is supported at the upper end by suitable angles as shown.

Figure 3:
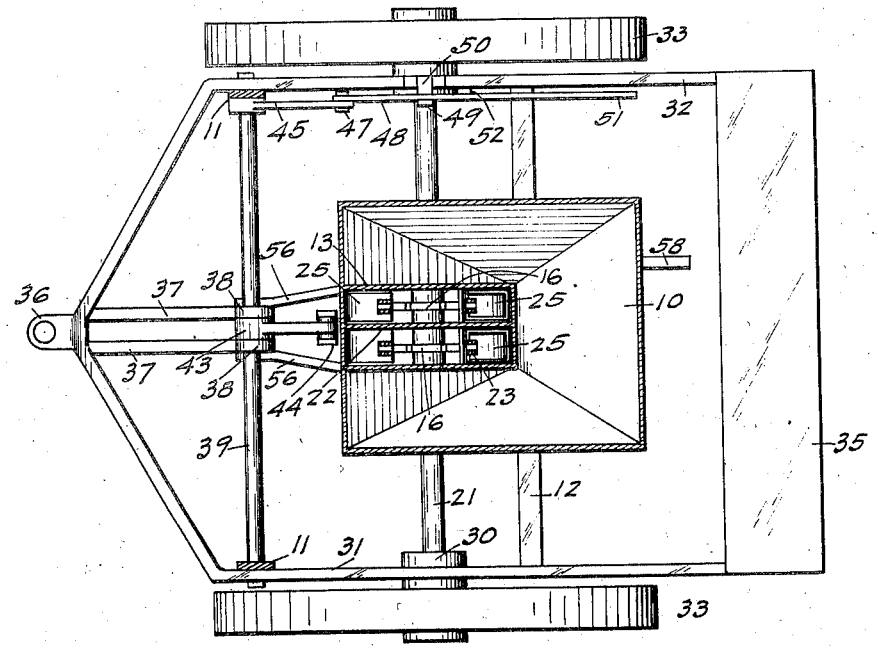
Fig. 3 is a section taken on line 3—3 of Fig. 5.
Figure 4:
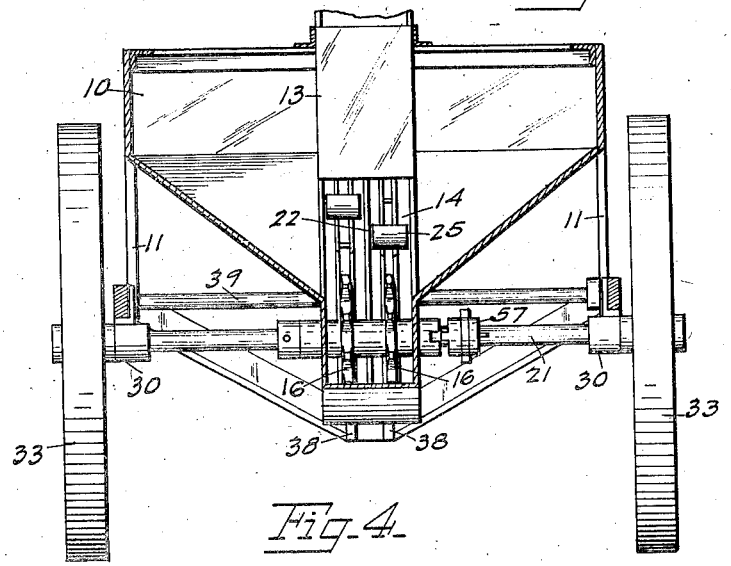
Fig. 4 is a section taken on line 4—4 of Fig. 5.
Figure 5:
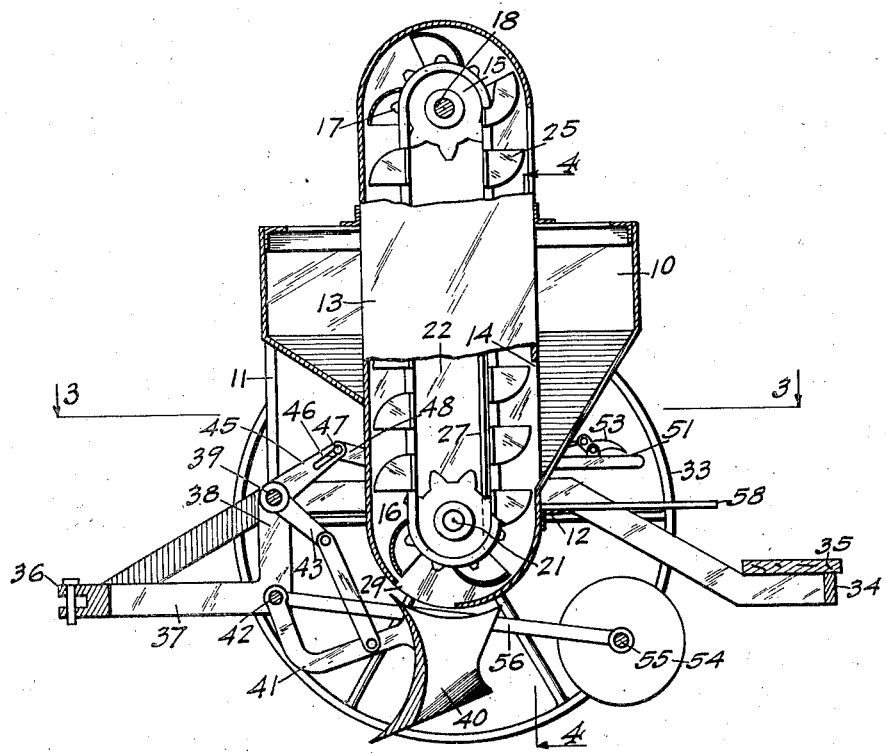
Fig. 5 is a section taken on line 5—5 of Fig. 2.
Figure 6:
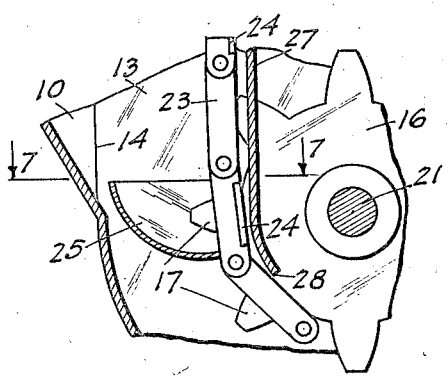
Fig. 6 is a fragmentary sectional elevation showing the bucket and the potato eye loosening means.
Figure 7:
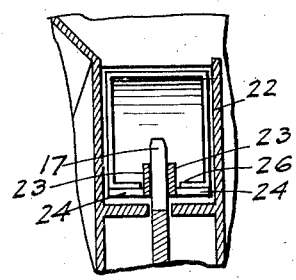
Fig. 7 is a section taken on line 7—7 of Fig. 6.

The elevator consists of a head sprocket 15 and a tail sprocket 16, both of which are provided with teeth sufficiently high to extend beyond the outer edge of the sprocket chain as shown at 17, so as to extend into and travel through the buckets as the chain passes over the sprockets. The head sprocket 15 is secured on a shaft 18 which is suitably mounted in bearings 19 which are mounted on the shelf angles 20 on housing 13. The tail sprocket 16 is rotatable on the axle 21. The elevator is preferably made double, the two sprockets being cast on a single hub for both head and tail ends, as shown in Fig. 4, a dividing wall 22 separates the housing 13 into two compartments.

The chain may be of any suitable style and is indicated as consisting of links 23 provided with suitable integral brackets 24 to which the buckets are secured.

The buckets 25 may be of any suitable form and are indicated as having an arcuately formed bottom and straight back, the center of the back and adjacent portion of the bottom being cut out to pass around the link 23, thereby forming flanges 26 by which they are secured to the brackets 24, the link forming the intervening portion of the back and providing a slot through which the elongated tooth 17 may project.

A guard plate 27 is disposed back of the chain on the up-travel side and extends upwardly to the height of the opening 14 and sufficiently below the bottom of this opening to prevent potato eyes from falling through, the length of the plate 27 from the bottom of opening 14 to the lower edge 28 being equal to or greater than the pitch of the buckets. A discharge opening 29 is provided at the bottom of the elevator housing through which the potato eyes are discharged into the furrow through the inside of the plow.

The axle 21 is rotatably mounted in bearings 30 which are suitably secured to the frame side members 31 and 32 and is supported by the wheels 33 at least one of which is fixedly secured to the axle, and drives the elevator through a clutch 57 which is slidable but not rotatable on the axle 21 and which is shifted into engagement with the sprockets by means of a shift lever 58 which is pivoted to the cross member 12, the clutch being of the usual jaw type.

The frame may be of any suitable construction and is shown as formed of a flat bar, the rearward portion being substantially of U shape and having sides 31 and 32, the rearward end of which is dropped and having the cross member 34 on which is mounted a foot board 35. The forward ends of the frame are also dropped and converged toward each other and at their coincidence have a coupling 36 formed for attachment to a tractor or other suitable tractive device. A pair of draw bars 37 spaced apart extend backwardly and have an upward extension 38 in the upper end of which a shaft 39 is rotatably mounted, the shaft extending through side members 31 and 32 and being also rotatable therein.

The plow 40 is of the usual furrow type having shares on both sides and a beam 41 which is pivotally mounted between the draw bars 37 at 42. A lever 43 is fixed on the shaft 39 and a link 44 is pivotally connected between the plow beam 41 and end of lever 43. A second lever 45 is fixed to shaft 39 and has a slot 46 in which a pin 47 is slidably disposed, the pin 47 being secured in a hand lever 48 which is intermediately pivoted at 49 in a bearing 50, and having an operating handle 51 integral therewith. A suitable sector 52 and latch 53 are provided for locking the plow in adjusted position.

The furrow closing means consists of a pair of downwardly and backwardly converging discs 54 which are angularly pivoted on a shaft 55, which is connected to the draw bars 37 by means of a pair of connecting rods 56 to the pivot pin 42.

The operation of the device is as follows: A suitable supply of potato eyes or seed potatoes are placed in the hopper 10 and the planter taken to the head of a proposed row. Lever 51 is shifted to its uppermost position which through levers 45 and 43 and links 44 drop the plow 40 which digs in and forms a furrow as the device is drawn along. Before starting, lever 58 is shifted to engage the clutch block 57 with the sprocket 16. As the wheels rotate during their travel along the row, the sprockets are driven, the buckets 25 receive the seed through opening 14 and carry it upward and over the head sprocket discharging the seed on the bottom of the preceding bucket, the teeth 17 extending into the bucket readily loosening any adhering potato eyes, which are then carried down and discharged through the opening 29 at the bottom of the elevator, thence dropping into the furrow between the sides of the plow. The discs 54 following, draw the soil into the furrow, covering the seed. The plow may be withdrawn at will by moving lever 51 down, and operation of the elevator stopped by shifting lever 58.

Having described an operable method of constructing and using the invention, it will be noted that variations in construction and arrangement of parts which are consistent with the appended claims may be resorted to without detracting from the spirit or scope of the invention or sacrificing any of the advantages thereof.

I claim:

1. In a potato planter, a hopper, a conveyor housing located within said hopper and communicating therewith, said housing having a discharge opening in the lower end thereof, spaced apart sprockets rotatively mounted in said housing, an endless conveyor engaging said sprockets, said conveyor having buckets provided with openings therein so arranged that the teeth of the sprockets project into and travel through the buckets in such manner as to loosen the seeds within the buckets, and means for actuating one of said sprockets.

2. In a potato planter, a hopper, a conveyor housing located within said hopper and communicating therewith, said housing having a discharge opening in the lower end thereof, spaced apart sprockets rotatively mounted in said housing, an endless chain conveyor having links in engagement with said sprockets, buckets secured to said chain and having slots in their rear walls coinciding with links in the chain, and means for actuating one of said sprockets, the teeth of said sprockets being of such length that they will project into the buckets and travel through them in such manner as to loosen the seeds carried thereby.

3. In a potato planter, a hopper, a conveyor housing located within said hopper and communicating therewith, said housing having a discharge opening in the lower end thereof, spaced apart sprockets rotatively mounted in said housing, an endless chain conveyor having links in engagement with said sprockets, buckets secured to said chain, each bucket having its rear side formed of inwardly bent supporting flanges having a slot between them, said slot coinciding with a link in said chain, and means for actuating one of said sprockets, the teeth of said sprockets being of such length that they will project into the buckets and travel through them in such manner as to loosen the seeds carried thereby.

4. In a potato planter, a hopper, a conveyor housing located within said hopper and communicating therewith, said housing having a discharge opening in the lower end thereof, spaced apart sprockets rotatively mounted in said housing, an endless chain conveyor having links in engagement with said sprockets, sets of brackets carried by said links, buckets secured to the brackets and having slots in their rear walls coinciding with links in the chain, and means for actuating one of said sprockets, the teeth of said sprockets being of such length that they will project into the buckets and travel through them in such manner as to loosen the seeds carried thereby.

5. In a potato planter, a hopper, a conveyor housing located within said hopper and communicating therewith, said housing having a discharge opening in the lower end thereof, spaced apart sprockets rotatively mounted in said housing, an endless chain conveyor having links in engagement with said sprockets, sets of brackets carried by said links, conveyor buckets, each bucket having its rear side formed of laterally bent supporting flanges having a slot between them, said flanges being secured to a set of said brackets, and means for actuating one of said sprockets, the teeth of said sprockets being of such length that they will project into the buckets and travel through them in such manner as to loosen the seeds carried thereby.

ERNEST G. SLATEN.